(12) United States Patent
Partokia et al.

(10) Patent No.: US 12,406,819 B2
(45) Date of Patent: Sep. 2, 2025

(54) OVERCURRENT PROTECTION

(71) Applicant: Cenfire Corp, Goleta, CA (US)

(72) Inventors: Soheil Seena Partokia, San Diego, CA (US); Brian Maertz, Santa Barbara, CA (US)

(73) Assignee: Cenfire Corp, Goleta, CA (US)

( * ) Notice: Subject to any disclaimer, the term of this patent is extended or adjusted under 35 U.S.C. 154(b) by 133 days.

(21) Appl. No.: 18/158,131

(22) Filed: Jan. 23, 2023

(65) Prior Publication Data
US 2024/0249901 A1 Jul. 25, 2024

(51) Int. Cl.
H01H 47/00 (2006.01)
H01H 50/00 (2006.01)
H01H 59/00 (2006.01)
H02H 1/00 (2006.01)
H02H 3/08 (2006.01)

(52) U.S. Cl.
CPC ........ *H01H 47/002* (2013.01); *H01H 50/005* (2013.01); *H01H 59/0009* (2013.01); *H02H 1/0007* (2013.01); *H02H 3/08* (2013.01)

(58) Field of Classification Search
CPC ...... H02H 1/0007; H02H 3/08; H01H 1/0036; H01H 1/20; H01H 47/002; H01H 50/005; H01H 59/0009; H01F 2007/068

USPC .......................................................... 361/87
See application file for complete search history.

(56) References Cited

U.S. PATENT DOCUMENTS

| 11,305,982 | B2 | 4/2022 | Gudeman et al. |
| 2002/0140533 | A1* | 10/2002 | Miyazaki ........... H01H 59/0009 335/78 |
| 2008/0310058 | A1* | 12/2008 | Premerlani ............ H01H 83/20 361/42 |
| 2019/0019644 | A1* | 1/2019 | Lee ........................ B81B 3/0054 |
| 2021/0202196 | A1 | 7/2021 | Gudeman et al. |

FOREIGN PATENT DOCUMENTS

EP 2162891 B1 8/2015

* cited by examiner

Primary Examiner — Kevin J Comber
(74) Attorney, Agent, or Firm — MLO, a professional corp.

(57) ABSTRACT

A microelectromechanical systems (MEMS) switch device including current sensing and overcurrent protection can include a movable plate movable between an open position and a closed position, wherein the moveable plate is moved by applying at least one or more of an electrostatic force and a magnetic force to move the movable plate. The movable plate can include a shunt operable to conduct current when the movable plate is the closed position. An inductive coil electronically coupled to the shunt can detect current conducted through the shunt.

14 Claims, 4 Drawing Sheets

OVERCURRENT PROTECTION

BACKGROUND

A microelectromechanical system (MEMS) can be manufactured using semiconductor manufacturing techniques to produce a device that can include both mechanically activated components and electronic circuitry. Using semiconductor manufacturing techniques can permit large scale manufacturing of reliable MEMS devices in packages that resemble semiconductor devices in size and cost.

DETAILED DESCRIPTION

Figure 1:
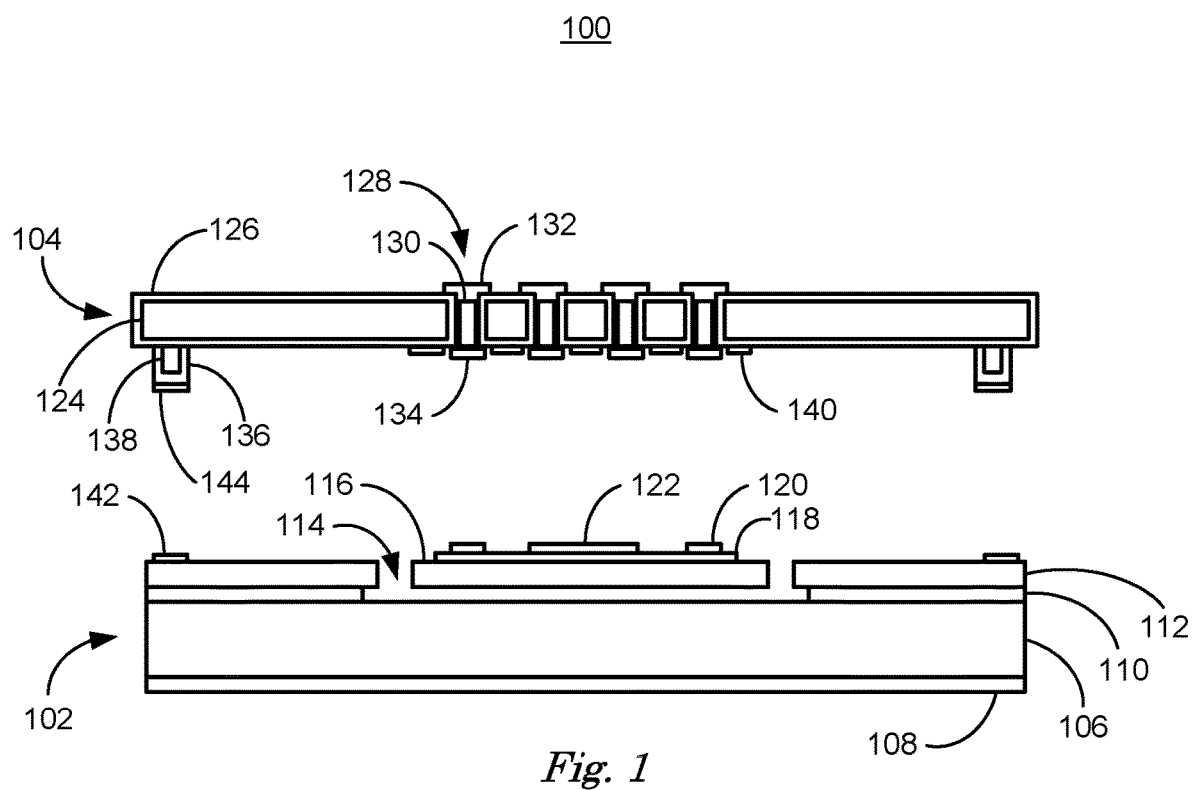
FIG. 1 is a block diagram of an example microelectromechanical system (MEMS) switch device.

FIG. 1 is a diagram of a cross sectional view of an example MEMS switch device 100. The MEMS switch device 100 can replace standard-scale electrical devices in many applications. The MEMS switch device 100 can change from an open position to a closed position to permit current to flow in a circuit based on an electrical signal, much like a standard-scale relay or contactor. Upon changing the electrical signal, the MEMS switch device 100 can change back to the open position and interrupt the flow of current in the circuit. An advantage of the MEMS switch device 100 is that the entire device can be manufactured lithographically in a single microelectronic package, much like a semiconductor package. A dual substrate electrostatic MEMS switch device is discussed in U.S. Pat. No. 11,305,982 B2, "Eight Spring Dual Substrate MEMS Plate Switch and Method of Manufacture," to Gudeman, et. Al., Apr. 19, 2022, which is incorporated herein by reference.

The MEMS switch device 100 can be manufactured using standard semiconductor lithographic techniques using standard semiconductor materials. Because of this, semiconductor electronics can be combined with the MEMS switch device 100 with little increase in manufacturing costs. Discussed herein are techniques for current sensing and overcurrent protection capabilities of the MEMS switch device 100, replacing components which would have to be added as devices external to the MEMS switch device 100. Integrating current sensing and overcurrent protection into the MEMS switch device 100 can decrease user cost and increase device reliability.

In the example shown in FIG. 1, the MEMS switch device 100 is a dual-substrate electrostatic MEMS switch device. Specifically, in such an example, the MEMS switch device 100 is fabricated on two substrates, namely a plate substrate 102 and a via substrate 104. The plate substrate 102 and via substrate 104 can be manufactured using semiconductor fabrication techniques as are known. The directions "up", "down" and locations "top" and "bottom" are used herein to identify relative positions shown in FIG. 1.

The plate substrate 102 can be a silicon-on-insulator (SOI) substrate. Specifically, with reference to FIG. 1, the plate substrate 102 includes a silicon handle wafer 106 and silicon dioxide layers 108, 110, namely a bottom silicon dioxide layer 108 and a top silicon dioxide layer 110. The silicon handle wafer 106 is between the silicon dioxide layers 108, 110. The silicon dioxide layers 108, 110 are insulators, i.e., are silicon dioxide insulating layers. The silicon handle wafer 106 may be thick relative to each silicon dioxide insulating layers 108, 110. As an example, the silicon handle wafer 106 may be, or be about, 1000 μm and the silicon dioxide layers 108, 110 may each be, or be about, 10 μm.

The plate substrate 102 includes a silicon device layer 112. The silicon device layer 112 is thin relative to the silicon handle wafer 106. As an example, the silicon device layer 112 may be 20-30 μm. The silicon device layer 112 is on the top silicon dioxide layer 110 in the example shown in FIG. 1. Specifically, the silicon device layer 112 is fabricated on the top silicon dioxide layer 110. In the example shown in FIG. 1, the silicon device layer 112 is on top of the top silicon dioxide layer 110, the top silicon dioxide layer 110 is on top of the silicon handle wafer 106, and the silicon handle wafer 106 is on top of the bottom silicon dioxide layer 108. Specifically, in the example shown in FIG. 1 is directly on the top silicon dioxide layer 110, the top silicon dioxide layer 110 is directly on the silicon handle wafer 106, and the silicon handle wafer 106 is directly on the bottom silicon dioxide layer 108.

The silicon device layer 112 can be etched using semiconductor fabrication techniques as are known to form a movable plate 116 of the silicon device layer 112 by etching a void region 114 underneath and around the movable plate 116. The silicon device layer 112 includes spring beam portions connecting the movable plate 116 to the silicon device layer 112. Specifically, the etching of the void 114 underneath and around the movable plate 116 leaves the spring beam 202 (FIG. 2) portions to connect the silicon device layer 112 to the movable plate 116.

The moveable plate 116 is moveable between an open position and a closed position. In an example process 400 shown in FIG. 4, the moveable plate 116 is moved from the open position to the closed position in block 405, as described further below. The movable plate 116 is deflectable up and down by. The silicon device layer 112 is fabricated thinly enough so that the movable plate 116 can be deflected up and down by bending the spring beam portions. The movable plate 116 can have a silicon dioxide insulating layer 118, a shunt 122, and movable plate contacts 120. The shunt 122 and the movable plate contacts 120 are arranged to make electrical connections to via contacts 134 when the MEMS switch device 100 is in the closed position. In the open position, the plate contacts 120 do not make an electrical connection to the via contacts 134.

The MEMS switch device 100, in one example, may be activated by an electrostatic force moving the movable plate 116 to the closed position. The MEMS switch is activated and de-activated by energizing or de-energizing an electrostatic element 140 included in the via substrate 10 to use electrostatic force to attract the movable plate 116 to the via substrate 104 and make electrical connections between via contacts 134 and the shunt 122 and the movable plate contacts 120 in the closed position and to release the moveable plate 116 to the open position. Electrostatic element 140 is connected to one polarity of an electrical circuit and the moveable plate 116 is connected to the other polarity via the bond ring 136. When an electrical potential is applied across the circuit that includes the electrostatic element 140 and the moveable plate 116, opposite electrical charges gather in the electrostatic element 140 and the moveable plate 116 causing an attractive force to be generated. The attractive force causes the moveable plate 116 to be drawn towards the electrostatic element 140 because the moveable plate 116 is suspended on deformable spring beams 202.

The via substrate 104 can include a silicon wafer 124 and a silicon dioxide insulating layer 126. The via substrate 104 includes vias 128. Each via 128 is a through-hole etched or drilled through the via substrate 104. Vias 128 are filled with a conductive material 130, for example aluminum or copper. The vias 128 include upper bonding pads 132 that connects the vias 128 to circuitry included on the via substrate 140 or to circuitry outside of the MEMS switch device 100. Vias 128 also include via contacts 134 that make electrical connections with shunt 122 and movable plate contacts 120 when the MEMS switch device 100 is activated. The via contacts 120, the movable plate contacts 120, and/or portions of the shunt 122 can include chromium and gold to enhance electrical conductivity of the via contacts 120.

The via substrate 104 includes standoffs 138 and a bond ring 136. Standoffs 138 provide an operating distance between the via substrate 104 and the plate substrate 102. The operating distance is determined by the distance that the spring beams 202 permit the moveable plate 116 to move based on the attractive force generated by the electrostatic element 140. The MEMS switch device 100 is assembled by lowering the via substrate 104 onto the plate substrate 102 and bonding the via substrate 104 to the plate substrate 102 by using pressure and elevated temperatures. The pressure and elevated temperatures form an alloy between a layer of indium 144 applied to the aluminum bond ring 136 and a layer of gold 142, applied to the plate substrate 102 to form a substantially hermetic seal. A substantially hermetic seal retains at least about 90% of its original composition of gases for the usable life of the device. Bonding the via substrate 104 to the plate substrate 102 can include introducing gases such as sulfur hexafluoride, carbon dioxide, or freon into the cavity formed by bonding the via substrate 104 to the plate substrate 104 at pressures above or below atmospheric pressure. In some examples the cavity formed by bonding the via substrate 104 to the plate substrate 102 can be evacuated. In some examples the via substrate 104 can be bonded to the plate substrate 102 using low-outgassing epoxies.

Figure 2:
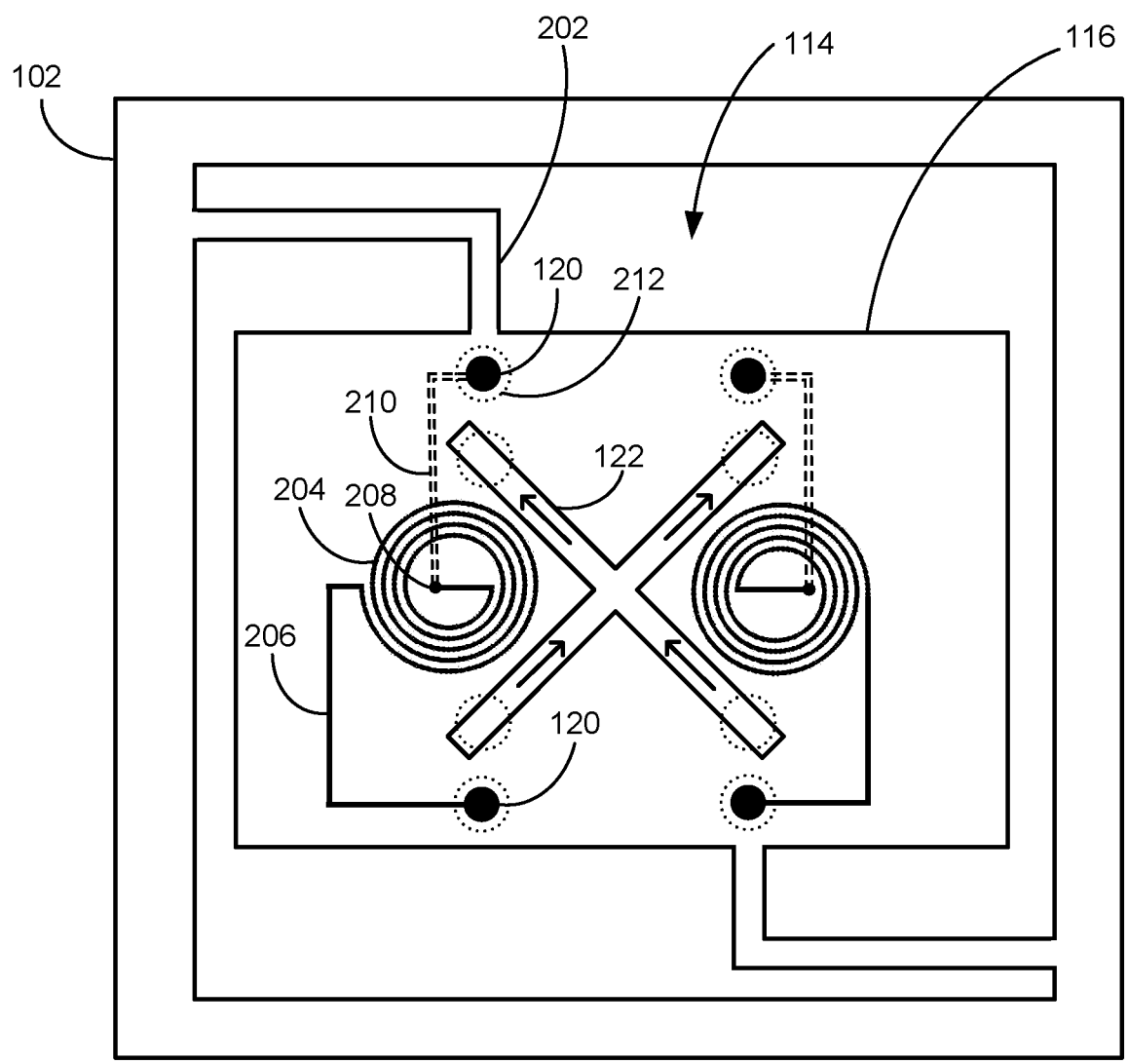
FIG. 2 is a diagram of an example MEMS switch device movable plate including inductive coils.

FIG. 2 is a diagram of a top-down view of the plate substrate 102. The plate substrate 102 includes the movable plate 116 connected to a body of the plate substrate 102 by spring beams 202. The spring beams 202 suspend the movable plate 116 over the void region 114, which, as described above, has been etched underneath and around the movable plate 116. The spring beams 202 permit the movable plate 16 to move up and down (directions in and out of the plane of FIG. 2) in response to electrostatic forces. Moving the movable plate 116 up, towards the via substrate 104 permits the via contacts 134 to make electrical contact with the shunt 122 and movable plate contacts 120 at the contact locations 212 indicated by the dotted lines. Making contact when the electrostatic force is activated makes the MEMS switch device 100 a normally open switch. In other words, the MEMS switch device 100 is open in the absence of application of electrostatic force. In some examples, the plate substrate 102 and the via substrate 104 can be placed in closer proximity by making the standoffs 138 smaller so that the contacts 134 make electrical contact with the shunt 122 and movable plate contacts 120 when the electrostatic force is off making the MEMS switch device 100 a normally closed device. The polarization of the electrostatic force can be reversed to de-activate the MEMS switch device 100 by moving the movable plate 116 away from the via substrate breaking the electrical contact between the contacts 134, the shunt 122 and the movable plate contacts 120.

The movable plate 116 can vibrate in a plane parallel to the diagram in FIG. 2 due to the electrostatic forces moving the movable plate 116 and the locations of the spring beams 202. By analyzing the vibrational modes, regions of the movable plate 116 that are subject to the least vibrational motion can be determined. For example, it can be determined that by placing the contact locations 212 for contacting the shunt 122 and movable plate contacts 120 along a line indicating nodes of a third-order vibrational mode of the movable plate 116, contact bounce and consequent intermittent electrical contact can be minimized.

The movable plate 116 can include one or more inductive coils 204. The inductive coils 204 can be loops or spiral conductors arranged in the plane formed by the silicon dioxide insulating layer 118 of the movable plate 116. In other words, in such examples, the inductive coils 204 are flat in the plane formed by the silicon dioxide insulating layer 118. The inductive coils 204 can be made by depositing aluminum on the silicon dioxide insulating layer 118 of the movable plate 116 using semiconductor lithography techniques as are known. The inductive coils 204 can be electrically connected to movable plate contacts 120 by a conductor 206 on the top of the silicon dioxide insulating layer 118 and by a buried conductor 210 underneath the silicon dioxide insulating layer 118. The buried conductor 210 is electrically connected to the inductive coil 204 by a via 208 which is a hole etched or drilled through the silicon dioxide insulating layer 118 and filled with a conductive material such as aluminum to electrically connect the buried conductor 210 to the inductive coil 204. Likewise, vias underneath movable plate contacts 120 can electrically connect the buried conductors 210 to the movable plate contacts 120. The inductive coils 204, conductors 206, buried conductors 210, and vias 208 can be formed using microelectronic manufacturing techniques as are known including lithography.

In some examples, one or more moveable plates 116 can be included in a MEMS switch device 100. The moveable plates 116 can include shunts 122, inductive coils 204, conductors 206, buried conductors 210, and vias 208. The MEMS switch device 100 can include one or more electrostatic elements 140 which can be activated in unison to or separately to move the moveable plates 116 in unison or separately. In some examples, the MEMS switch device 100 can include magnetic forces to move the moveable plates 116. Magnetic forces can be activated by using electromagnets in place of or in addition to electrostatic elements 140. Moveable plates 116 can include a feature having magnetic susceptibility to permit the moveable plates 116 to be attracted by the electromagnets.

The shunt 122 is operable to conduct current when the movable plate 116 is the closed position. In the example process 400 shown in FIG. 4, current is conducted through the shunt 122 in block 410, as described further below. The level of current conducted through the shunt 122 is detected, for example, in block 415 of example process 400 in FIG. 4. Attaching the inductive coils 204 to movable plate contacts 120 permits electrical signals generated in the inductive coils 204 by current in the adjacent shunt 122 to be communicated by the vias 128 to circuitry in the via substrate. Current in the shunt 122 can travel in the directions indicated by the arrows, for example, or in the opposite directions when the polarity of the electrical force transmitted by the MEMS switch device 100 is reversed. In examples where an alternating current is being transmitted by the MEMS switch device 100, the arrows would reverse direction as the current alternates.

The inductive coils 204 of the MEMS switch device 100 improve the operation of the MEMS switch device 100 by remotely sensing current passing through the shunt 122. Remote current sensing refers to current sensing that is accomplished at the location where the current is being transmitted by the shunt 122, as opposed to sensing current at a location closer to the source of the current, for example where the current source is connected to the MEMS switch device 100. Remote current sensing can be a more accurate and more timely measure of current passing through the shunt 122 than measuring the current outside of the MEMS switch device 100. Remote current sensing using inductive coils 204 can improve operation of a MEMS switch device 100 by permitting rapid and accurate overcurrent protection. Inductive coils 204 can detect overcurrent conditions that can potentially damage the MEMS switch device 100 and switch off (or on) the electrostatic force and open the MEMS switch device 100 to interrupt the current flow and protect the switch.

Current in the shunt 122 induces an electrical field flux in the inductive coils 204 by electrically coupling electrical field fluxes in the inductive coils 204 to the current in the shunt 122 according to the Lorentz force law, which states:

$$\vec{F} = q\vec{E} + q\vec{v} \times \vec{B}$$

where $\vec{F}$ is the electrical field flux in a conductive metal (the inductive coils 204), $q\vec{E}$ is the electrical force in the shunt 122 and $q\vec{v} \times \vec{B}$ is the magnetic field generated by the current in the shunt 122. Because the distance between the inductive coils 204 and the shunt 122 are fixed, the coupling factor q will be constant, the change in electrical flux will indicate a given amount of current.

Figure 3:
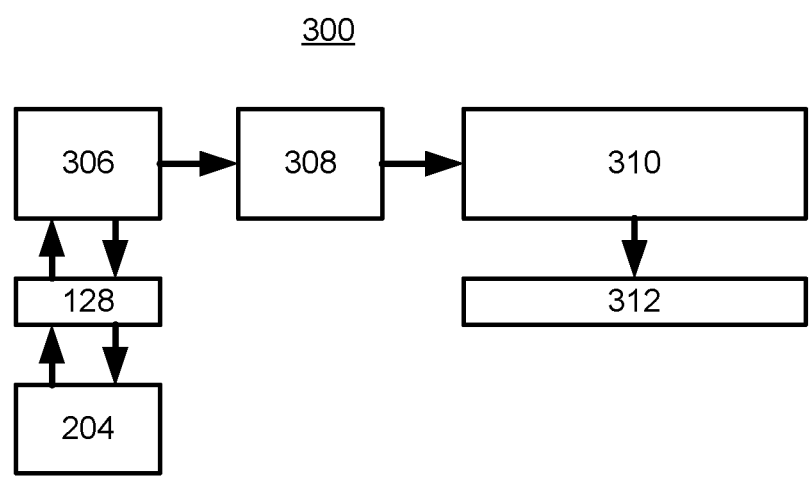
FIG. 3 is a diagram of an example current monitoring and overcurrent protection system.

FIG. 3 is a diagram of a current sensing and overcurrent protection system 300 as disclosed herein. Current sensing and overcurrent protection system 300 includes one or more inductive coils 204 included in a movable plate 116 portion of a MEMS switch device 100, arranged adjacent to a shunt 122. In this context adjacent means close enough to permit inductive coupling between the inductive coils 204 and the shunt 122 but not close enough to permit current to flow directly from the shunt 122 to the inductive coils 204, or about 100 µm. To promote inductive coupling, the conductors that form the inductive coils 204 should be substantially parallel to the conductors that form the shunt 122 without touching. The inductive coils 204 are connected to an amplifier 306 constructed on the via substrate 104 through vias 128. The amplifier 306 detects the electrical field flux induced in the inductive coils 204 by the current in the shunt 122 voltage. The detected voltage is amplified by the amplifier 306. In addition, the amplifier 306 can optionally filter the signal to remove transient noise. The inductive coils 204 include a small amount of current. Detecting the electrical field flux in the inductive coils 204 can be improved by the amplifier 306 trickling a small current (~10 µA) through the inductive coils 204 to raise the noise floor for detecting electrical flux in the inductive coils 204. The current is small in comparison to the amount of current generated in the inductive coils 204 when the shunt 122 is in an overcurrent condition.

The amplified voltage from the amplifier 306 is transmitted to a threshold detector 308 which compares the amplified voltage to a calibrated threshold. The comparison of the amplified voltage to the calibrated threshold is shown in block 420 in the example process 400 shown in FIG. 4. The calibrated threshold can be determined empirically by inputting increasing currents through the MEMS switch device 100 and recording amplified voltages that indicate damage to the MEMS switch device 100. The threshold can be set to a value that is lower than the lowest amplified voltage that indicates damage.

An electrical field flux in the inductive coil 204 being greater than the calibrated threshold indicates an overcurrent condition in the shunt 122 and de-activates the MEMS switch device 100 by moving the movable plate 116 to the open position. The deactivation of the MEMS switch device 100 is shown in block 425 of process 400 in FIG. 4, as described further below. When the threshold detector 308 detects an amplified voltage that is greater than the threshold (e.g., in block 420 in process 400), a signal is transmitted to electrostatic circuitry 310 to indicate that the signal that is being transmitted to the electrostatic actuator 312 to attract the movable plate 116 to the via substrate 104 should be shut off. Shutting off the signal to the electrostatic actuator 312 opens the MEMS switch device 100 and ceases the flow of current through the shunt 122 and protects the MEMS switch device 100 from overcurrent damage.

In some examples, the amplified electrical field flux signal can be transmitted to other circuitry on the via substrate 104 or transmitted outside the MEMS switch device 100 to monitor the current being carried by the shunt 122. Amplifier 306, threshold detector 308, electrostatic circuitry 310, and electrostatic actuator 312 can be fabricated on the via substrate 104 using semiconductor processing techniques as are known. Current sensing and overcurrent protection system 300 improves the operation of the MEMS switch device 100 by providing accurate, rapid and reliable current sensing and overcurrent protection to the MEMS switch device 100 by integrating current sensing and overcurrent protection into the MEMS switch device 100 in a single microelectronic package.

Figure 4:
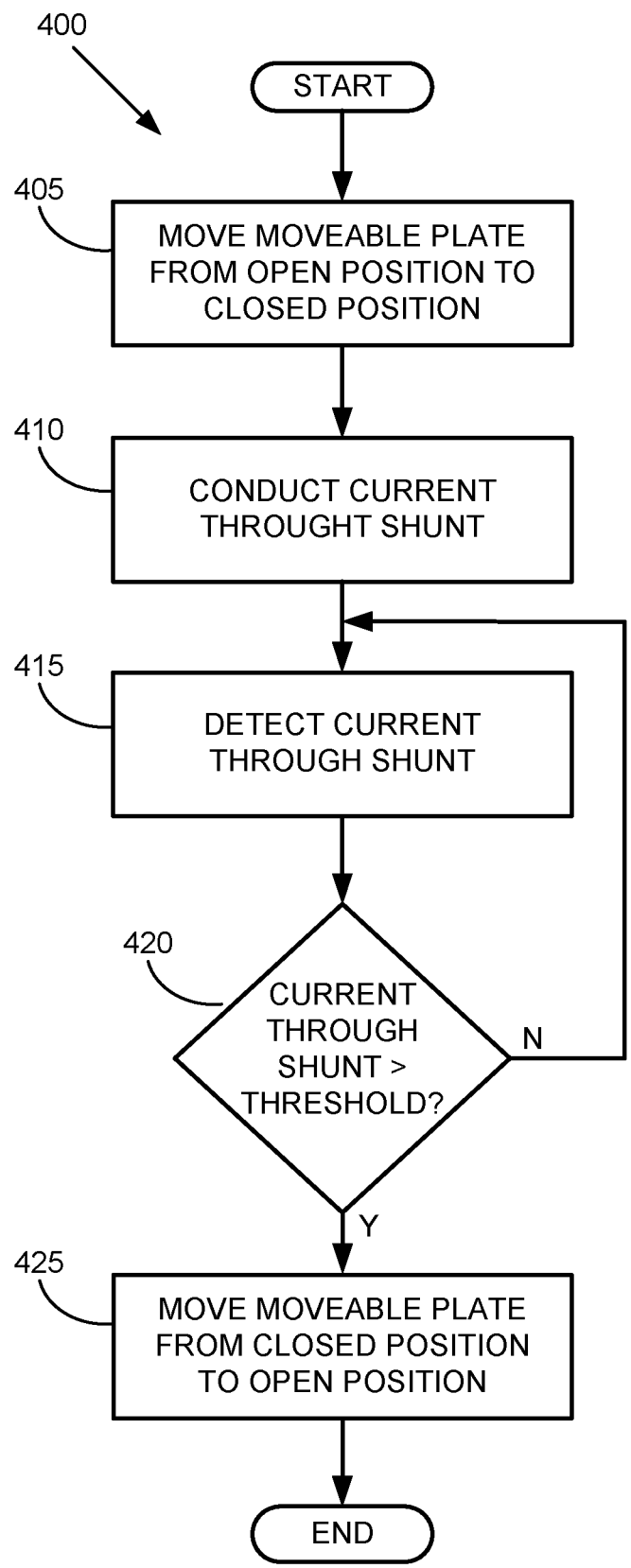
FIG. 4 is an example process performed by the MEMS switch device.

FIG. 4 is a diagram of an example process 400 performed by the MEMS switch device 100. Use of "in response to," "based on," and "upon determining" herein, including with reference to the example process 400, indicates a causal relationship, not merely a temporal relationship.

As set forth above, the process 400 includes moving the movable plate 116 from the open position to the closed position, as shown in block 405 and as described above. As an example, the moveable plate 116 may be moved by applying an electrostatic force to move the movable plate 116 to the closed position, as described above. The process 400 includes conducting current through the shunt 122 when the movable plate 116 is the closed position, as shown in block 410 and as described above.

The process 400 includes detecting the level current conducted through the shunt 122, as shown in block 415 and as described above. In the example described above, the level current conducted through the shunt 122 is detected with the inductive coil 204 electrically coupled to the shunt 122, as described above.

The process 400 includes monitoring for overcurrent condition in the shunt 122, as shown in block 420 and deactivation of the MEMS switch device 100 in the event an overcurrent condition is identified, as shown in block 425. Specifically, current through the shunt 122 may be monitored by comparing the level of current through the shunt 122 with the user-defined threshold, as described above. In the event the level of current through the shunt 122 is below the user-defined threshold in block 420, the process 400 repeatedly continues to monitor for overcurrent condition in the shunt 122 during the time the moveable plate 116 is in the closed position, as indicated by the feedback arrow from block 420 to block 415. In the event the level of current through the shunt 122 is above the user-defined threshold, i.e., an overcurrent condition, the process 400 includes moving the moveable plate 116 from the closed position to the open position. In other words, the process 400 includes moving the moveable plate 116 from the closed position to the open position in response to detection of a level of current through the shunt that exceeds the user-defined threshold, i.e., an overcurrent condition.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain example embodiments.

The invention claimed is:

1. A microelectromechanical systems (MEMS) switch device, comprising:
   a movable plate movable between an open position and a closed position, wherein the MEMS switch device is activated by a magnetic force moving the movable plate to the closed position;
   shunt operable to conduct current when the movable plate is in the closed position; and
   an inductive coil electrically coupled to the shunt, wherein an electrical field flux in the inductive coil being greater than a calibrated threshold indicates an overcurrent condition in the shunt and de-activates the MEMS switch device by moving the movable plate to the open position.

2. The MEMS switch device of claim 1, wherein the current conducted by the shunt induces the electrical field flux in the inductive coil.

3. The MEMS switch device of claim 1, wherein one or more movable plates are coupled to a first substrate via one or more spring beams.

4. The MEMS switch device of claim 1, wherein the inductive coil includes loops arranged in a plane.

5. The MEMS switch device of claim 1, wherein the MEMS switch device and the inductive coil are included in a microelectronic package.

6. The MEMS switch device of claim 1, wherein the inductive coil includes a small amount of current.

7. The MEMS switch device of claim 1, wherein the inductive coil is arranged adjacent to the shunt.

8. A method for current sensing in a microelectromechanical systems (MEMS) switch device, comprising:
   moving one or more movable plates from an open position to a closed position, wherein the moveable plate is moved by applying a magnetic force to move the one or more movable plates, and the MEMS switch device is activated by the magnetic force moving the one or more movable plates to the closed position;
   conducting current through a shunt when the movable plate is the closed position; and
   detecting the current conducted through the shunt with an inductive coil electrically coupled to the shunt, wherein an electrical field flux in the inductive coil being greater than a calibrated threshold indicates an overcurrent condition in the shunt and de-activates the MEMS switch device by moving the movable plate to the open position.

9. The method of claim 8, wherein the current conducted by the shunt induces a voltage in the inductive coil.

10. The method of claim 8, wherein one or more movable plates are coupled to a first substrate via one or more spring beams.

11. The method of claim 8, wherein the inductive coil includes loops arranged in a plane.

12. The method of claim 8, wherein the MEMS switch device and the inductive coil are included in a microelectronic package.

13. The method of claim 8, wherein the inductive coil includes a small amount of current.

14. The method of claim 8, wherein the inductive coil is arranged adjacent to the shunt.

* * * * *